(12) United States Patent
Vivarelli

(10) Patent No.: US 7,085,021 B1
(45) Date of Patent: Aug. 1, 2006

(54) FAX OVER INTERNET PROTOCOL CLIENT DRIVER

(75) Inventor: Philippe Vivarelli, Valbonne (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 1033 days.

(21) Appl. No.: 09/678,363

(22) Filed: Sep. 29, 2000

(51) Int. Cl.
*G06F 15/00* (2006.01)
*H04N 1/00* (2006.01)
*H04L 12/56* (2006.01)
*H04M 11/00* (2006.01)

(52) U.S. Cl. ............... 358/435; 358/1.15; 358/434; 358/438; 370/395.52; 379/100.06

(58) Field of Classification Search ............... 358/1.15, 358/407, 434, 435, 438; 379/100.17, 100.09, 379/100.12, 100.06; 370/395.02, 395.52, 370/352, 466
See application file for complete search history.

(56) References Cited

U.S. PATENT DOCUMENTS

| | | | |
|---|---|---|---|
| 6,330,070 B1* | 12/2001 | Toyoda et al. | 358/1.15 |
| 6,483,600 B1* | 11/2002 | Schuster et al. | 358/1.15 |
| 6,636,587 B1* | 10/2003 | Nagai et al. | 379/88.14 |
| 6,801,341 B1* | 10/2004 | Joffe et al. | 358/407 |
| 6,825,955 B1* | 11/2004 | Shibata | 358/402 |
| 6,868,146 B1* | 3/2005 | Kang | 379/100.06 |

FOREIGN PATENT DOCUMENTS

WO WO 97/10668 * 3/1997

OTHER PUBLICATIONS

Intel, "T.38 and the future of fax", Apr. 30, 1999, Intel White Papers, 1-7, http://www.intel.com/network/csp/resources/white_papers/4361web.htm.*
ITU-T, "Procedures for real-time Group 3 facsimile communication over IP networks", Jun. 1998, ITU-T, T.38.*
ITU-T, "Procedures for real-time Group 3 facsimile communication over IP networks", Jun. 1998, ITU-T, T.38, Amendment 1, Apr. 1999.*
ITU-T, "Packet-base multimedia communications systems", ITU-T, H.323, Sep. 1999.*

* cited by examiner

*Primary Examiner*—Douglas Q. Tran
*Assistant Examiner*—Chan S. Park
(74) *Attorney, Agent, or Firm*—Christopher J. Rourk; Jackson Walker L.L.P.

(57) ABSTRACT

A fax over Internet protocol client driver. The present invention enables a client to support a fax over Internet protocol. Whereas conventional systems commonly rely upon an Internet service provider (ISP) to support the fax over Internet protocol functionality, the invention ensures that a client can perform multiple Internet sessions, one of which is a fax over Internet protocol session. There is no need to disconnect from a current Internet session, and then re-establish another Internet session. The client is any number of devices including a personal computer, a laptop computer, a pen based computer, an Internet capable fax machine, or any other fax capable device. By providing a fax over Internet protocol driver within the client, the client can send a fax transmission over the Internet, even in the situation where the ISP that the client solicits does not support that particular functionality.

20 Claims, 5 Drawing Sheets

FAX OVER INTERNET PROTOCOL CLIENT DRIVER

BACKGROUND

1. Technical Field

The present invention relates generally to communications via the Internet; and, more particularly, it relates to an embedded facsimile over Internet protocol into a variety of devices.

2. Related Art

In conventional systems that are operable to transmit facsimile (fax) over the Internet, the burden is commonly placed upon the Internet service providers (ISPs) to perform and provide the fax over Internet protocol. FIG. 1 shows a conventional embodiment 100 where ISPs support a fax over Internet protocol session. A fax #1 110 dials into a telephone network provider #1 120. The telephone network provider #1 120 then couples to an ISP #1 130. The ISP #1 130 is operable to perform the fax over Internet protocol 132, most commonly implemented as a T38 protocol 134. The ISP #1 130 communicates to an ISP#2 135 via an Internet protocol network 199. The Internet protocol network 199 is itself the Internet in some embodiments, and it is a private dedicated network operating using an Internet protocol in others. The ISP #2 135, similar to the ISP #1 130, is operable to perform the fax over Internet protocol 137, again most commonly implemented as a T38 protocol 139. The ISP #2 125 then contacts a telephone network provider #2 125 that calls a fax #2 115 to complete the fax transaction. As shown within the FIG. 1, the connection between the fax #1 110 and the fax #2 115, represented by the L1-L3-L4-L5-L6 connections, is a fax over Internet protocol session.

Similarly, a client 150 employing a class 1, class 2, or class 2.0 fax modem and fax software package is also operable to send a fax to the fax #2 115 using the ISP provided fax over Internet protocol. The client 150 is any number of computers including a laptop computer 151 or a personal computer 152. The client 150 dials into the telephone network provider #1 120. The telephone network provider #1 120 then couples to the ISP #1 130. The ISP #1 130 performs the fax over Internet protocol 132. The ISP #1 130 communicates to the ISP#2 135 via the Internet protocol network 199. The ISP #2 125 then contacts the telephone network provider #2 125 that calls the fax #2 115 to complete the fax transaction. As shown within the FIG. 1, the connection between the client 150 and the fax #2 115, represented by the L2-L3-L4-L5-L6 connections, in is also a fax over Internet protocol session.

One deficiency in the conventional fax over Internet protocol, in it being supported by an ISP as shown in the FIG. 1, is that when a user of the client 150 is performing any Internet access session (other than a fax over Internet protocol session), that user must first de-couple from his current Internet access session in order to perform his fax over Internet protocol session.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in a T38 client driver system. The T38 client driver system includes a client having a T38 protocol client driver that is operable to support a fax over Internet protocol session, a first Internet service provider to which the client connects, a second Internet service provider that is operable to support a T38 protocol, and an Internet protocol network. The first Internet service provider and the second Internet service provider are communicatively coupled via the Internet protocol network. The T38 client driver system also includes a telephone network provider and a fax machine that is operable to be connect to the second Internet service provider via the telephone network provider. A fax over Internet protocol session is maintained between the client and the fax machine via the first Internet service provider, the Internet protocol network, the second Internet service provider, and the telephone network provider. The client maintains the fax over Internet protocol session with the fax machine using the T38 protocol client driver.

In certain embodiments of the invention, the client contains a memory, and the T38 protocol driver is contained in the memory. The Internet protocol network is a private network that is operable using an Internet protocol. The client connects to the first Internet service provider using an integrated services digital network. The client connects to the first Internet service provider using an asymmetric digital subscriber line. The client is operable to maintain at least one additional Internet protocol session or multiple Internet protocol sessions including the fax over Internet protocol session. The client is a laptop computer in some embodiments. The client contains a modem having firmware, and firmware contains the T38 protocol client driver.

Other aspects of the present invention can be found in a fax over Internet protocol driver system. The fax over Internet protocol driver system contains a client having a fax over Internet protocol client driver that is operable to support a fax over Internet protocol session, a first Internet service provider to which the client connects, and an Internet protocol network that connects the first Internet service provider and a second Internet service provider. In addition, the fax over Internet protocol driver system includes a fax machine that is operable to be communicatively coupled to the second Internet service provider, and the client maintains a fax over Internet protocol session with the fax machine using the fax over Internet protocol client driver.

In certain embodiments of the invention, the client maintains an additional Internet protocol session or multiple Internet protocol sessions. The Internet protocol network is itself the Internet in some embodiments. The Internet protocol network is a private network that is operable using an Internet protocol in other embodiments. The client is a personal computer. The fax over Internet protocol uses the T38 protocol. The client connects to the first Internet service provider using a public switched telecommunications network.

Other aspects of the present invention can be found in a method to support a fax over Internet protocol session. The method involves connecting a client to a first Internet service provider over a first connection where the client comprises a fax over Internet protocol client driver that is operable to support a fax over Internet protocol session. The method also involves establishing a second connection between the first Internet service provider and a second Internet service provider via an Internet protocol network where the second Internet service provider establishes a third connection with a fax machine. Finally, the method involves transmitting a fax from the client to the fax machine using a fax over Internet protocol session that is supported by the fax over Internet protocol client driver of the client via the first connection, the second connection, and the third connection.

In certain embodiments of the invention, the first connection is an asymmetric digital subscriber line. The client is any number of devices including another fax machine that is Internet capable. The Internet protocol network is a private network that is operable using an Internet protocol in some embodiments method is also operable to support an additional Internet protocol session along with the fax over Internet protocol session.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments are considered in conjunction with the following drawings.

DETAILED DESCRIPTION OF THE INVENTION

Figure 1:
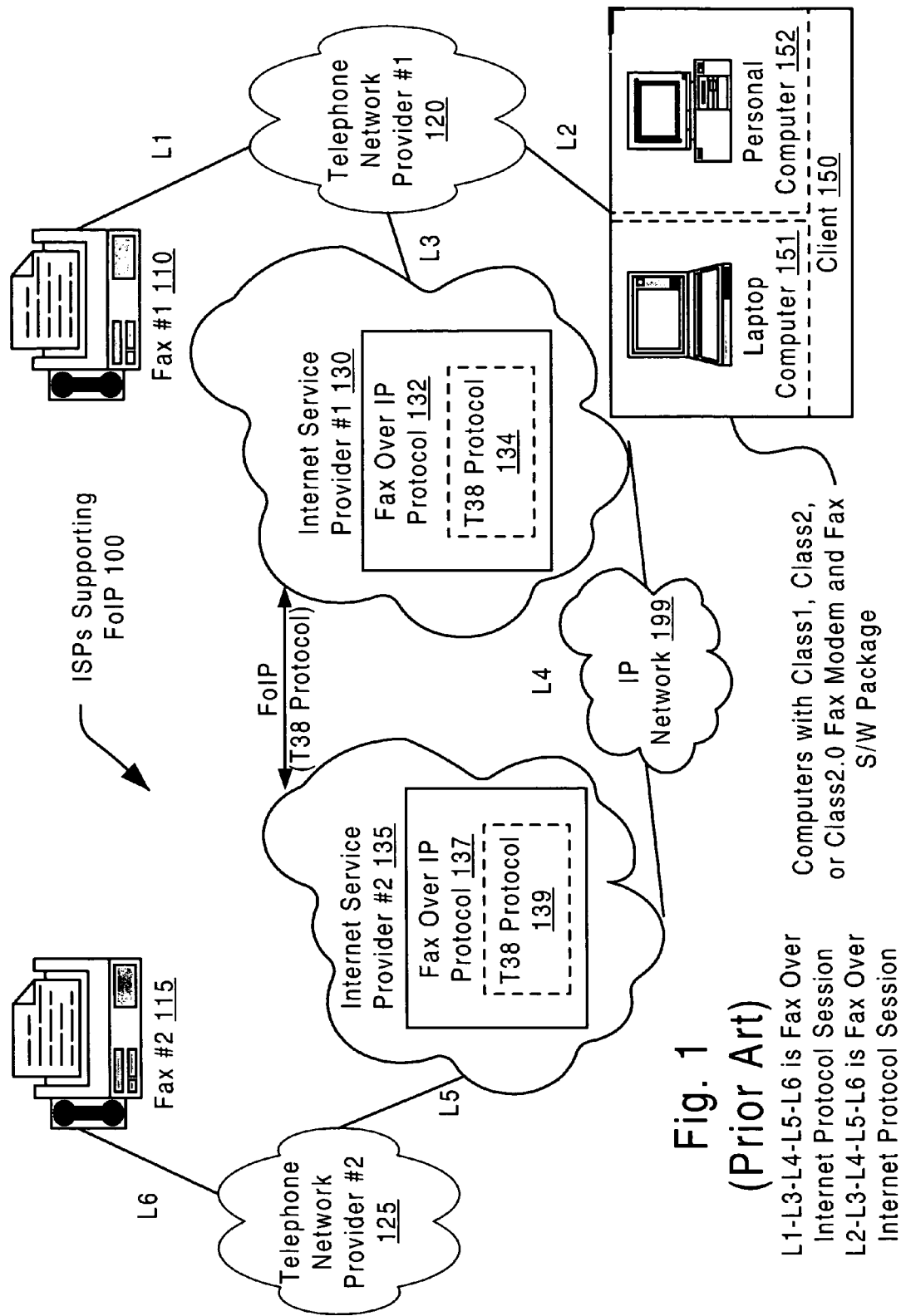
FIG. 1 is a system diagram illustrating Internet Service Providers supporting FoIP 100 in accordance with prior art.
Figure 2:
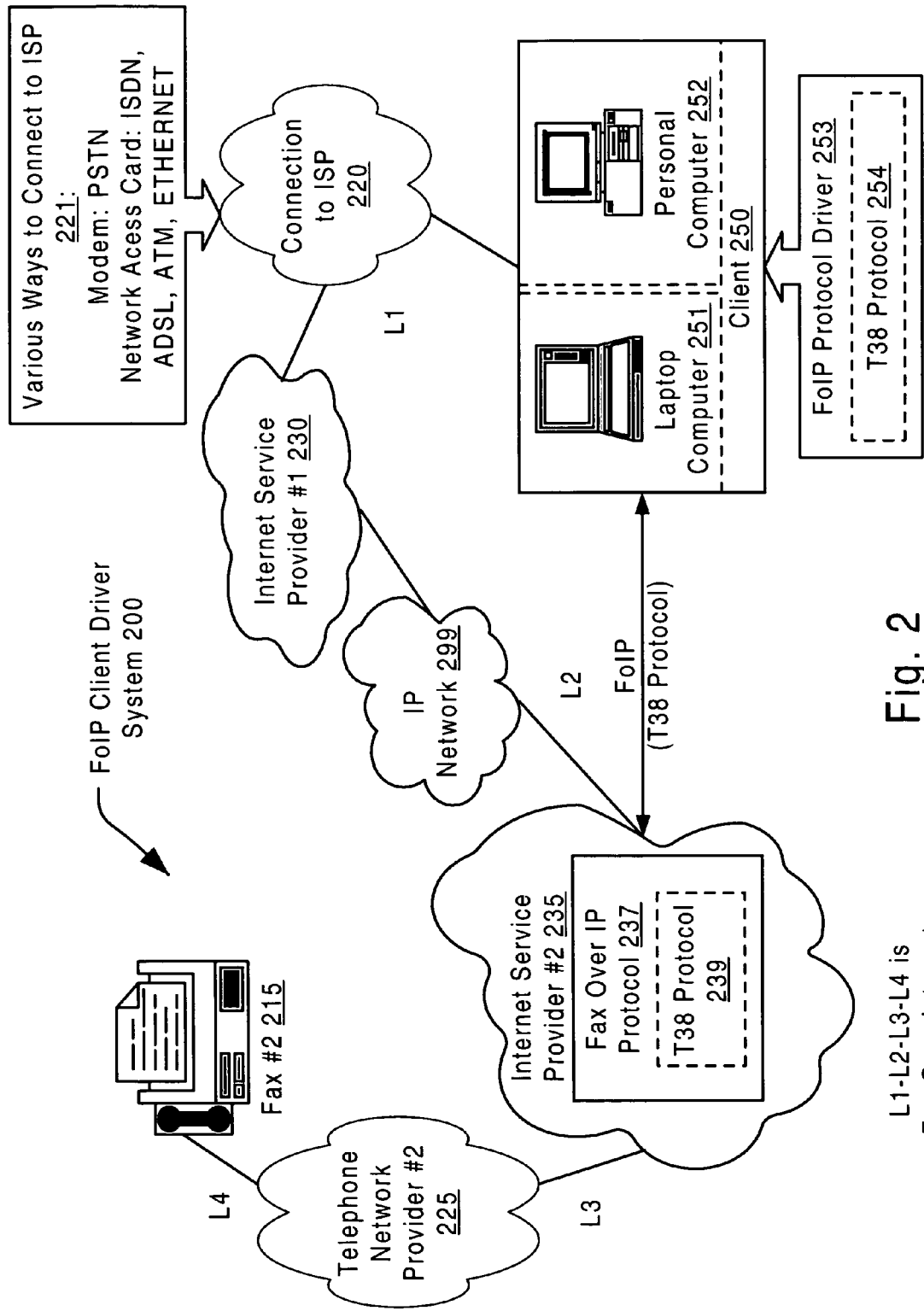
FIG. 2 is a system diagram illustrating an embodiment of a fax over Internet protocol client driver system built in accordance with the present invention.

FIG. 2 is a system diagram illustrating an embodiment of a fax over Internet protocol client driver system 200 built in accordance with the present invention. Within the fax over Internet protocol client driver system 200, a client 250 is operable to connect to an Internet service provider (ISP) #1 230 as shown by a connection to ISP cloud 220. An embedded fax over Internet protocol driver 253 is contained within the client 250. If desired, a T38 protocol 254 is supported by the fax over Internet protocol driver 253. The client 250 is any number of devices including a laptop computer 251 or a personal computer 252. The client 250 uses any number of various ways 221 to perform the connection to the ISP 220 including using a public switched telephone/telecommunications network (PSTN) when using a modem. In addition, the client 250 uses any number of various ways 221 to perform the connection to the ISP 220 including using an integrated services digital network (ISDN), an asymmetric digital subscriber line (ADSL), an asynchronous transfer mode (ATM), or an Ethernet connection when using a network access card, as shown within the number of various ways 221.

After the client connects to the ISP #1 230 via the connection to the ISP 220 cloud, the ISP #1 230 connects to an ISP#2 235 via an Internet protocol network 299. The Internet protocol network 299 is itself the Internet in some embodiments, and it is a private dedicated network operating using an Internet protocol in others. The ISP #2 235 is operable to perform a fax over Internet protocol 237, most commonly implemented as a T38 protocol 239. The ISP #2 225 then contacts a telephone network provider #2 225 that calls a fax #2 215 to complete the fax transaction. As shown within the FIG. 2, the connection between the client 250 and the fax #2 215, represented by the L1-L2-L3-L4 connections, is a fax over Internet protocol session provided between the client 250 and the fax #2 215. Using the embedded fax over Internet protocol driver 253 within the client 250, a user of the client 250 is provided the capability to maintain a current Internet session and also to initiate a fax over Internet protocol session simultaneously. Given that the fax over Internet protocol is supported by the client 250 itself, the client 250 need not rely on an ISP to support a fax over Internet protocol session.

Figure 3:
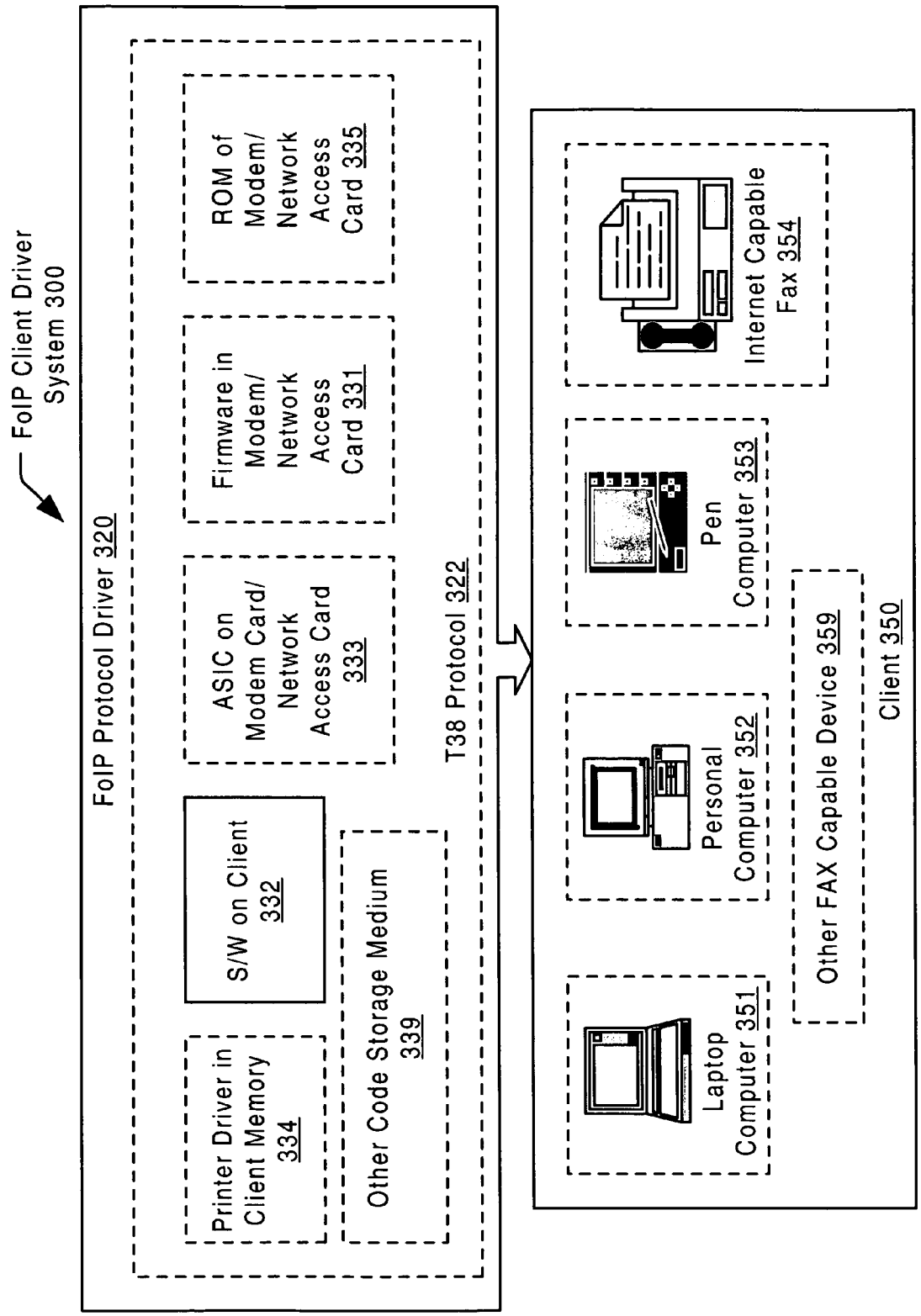
FIG. 3 is a system diagram illustrating another embodiment of a fax over Internet protocol client driver system built in accordance with the present invention.

FIG. 3 is a system diagram illustrating another embodiment of a fax over Internet protocol client driver system 300 built in accordance with the present invention. The fax over Internet protocol client driver system 300 contains a client 350 into which a fax over Internet protocol driver 320 is installed. The client 350 is any number of devices including a laptop computer 351, a personal computer 352, a pen computer 353, an Internet capable fax 354, or any other fax capable device 359. For example, the any other fax capable device 359 is a fax-capable Internet appliance that contains the fax over Internet protocol driver 320 in order to send a fax over the Internet in certain embodiments of the invention.

The fax over Internet protocol driver 320 contains a T38 protocol 322 in certain embodiments of the invention. The T38 protocol 322 is contained in software (S/W) 332 on the client 350. In alternative embodiments, the T38 protocol 322 is contained in firmware in a modem/network access card 331, a printer driver in the client's memory 334, or within read only memory (ROM) of the modem/network access card 335. If desired, an application specific integrated circuit (ASIC) located on a modem card/network access card 333 supports the T38 protocol 322. In addition, any other code storage medium 339 is also operable to store the T38 protocol 322 that is used to support the fax over Internet protocol driver 320.

As described above and also further described below, when using a PSTN to connect to an ISP, a modem is employed. When using any of the other methods to connect to the ISP, a network access card is employed. Either a network access card or a modem is used in the various embodiments of the invention as required by the particular situation without departing from the scope and spirit of the invention.

Figure 4:
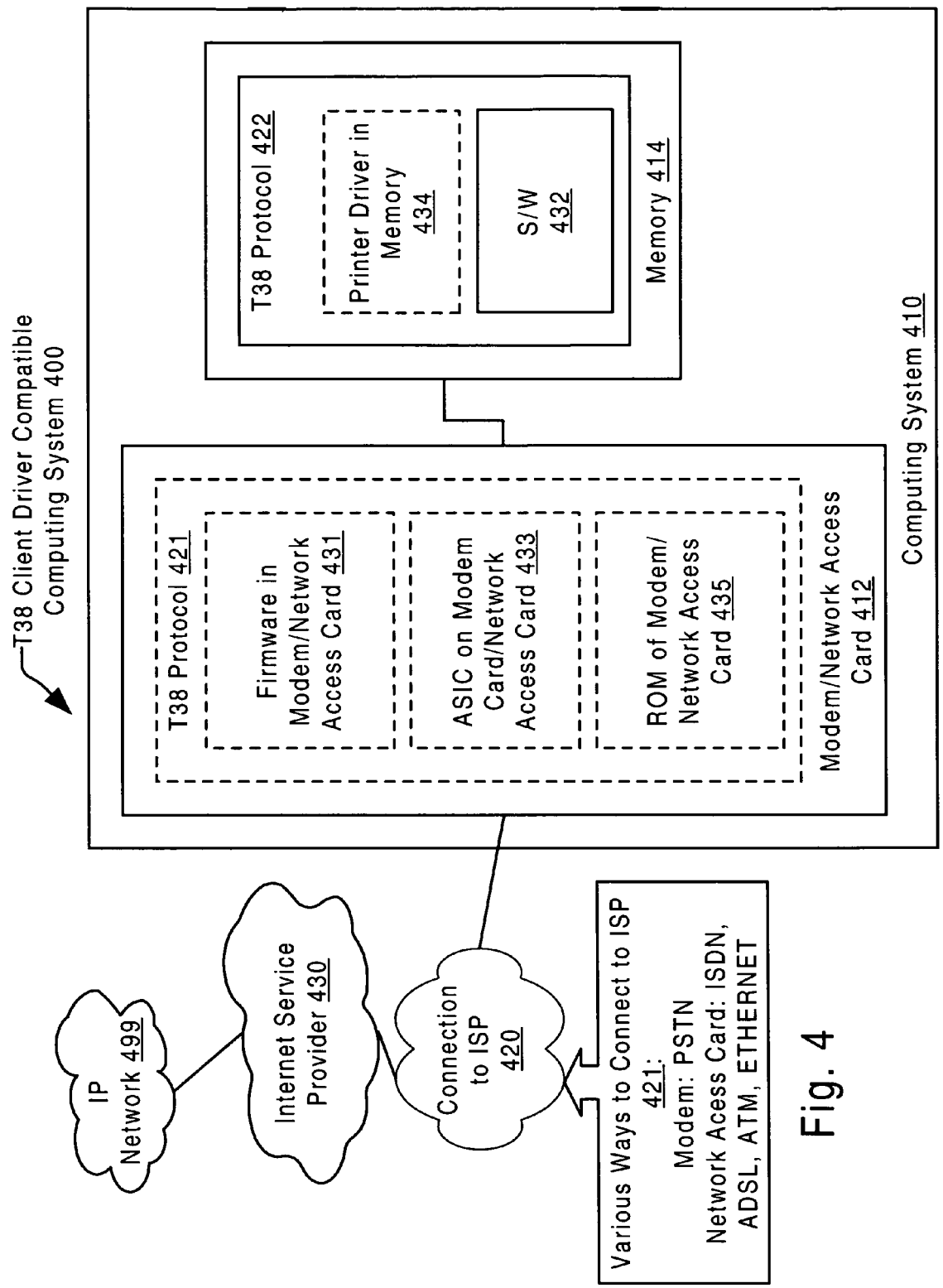
FIG. 4 is a system diagram illustrating an embodiment of a T38 client driver, built in accordance with the present invention, that is compatible with a computing system.

FIG. 4 is a system diagram illustrating an embodiment of a T38 client driver 400, built in accordance with the present invention, that is compatible with a computing system. The T38 client driver 400 that is compatible with a computing system contains a computing system 410 that connects to an ISP 430 as shown by a connection to ISP cloud 420. The ISP 430 is operable to connect to an Internet protocol network 499. The Internet protocol network 499 is itself the Internet in some embodiments, and it is a private dedicated network operating using an Internet protocol in others.

The computing system 410 uses any number of various ways 421 to perform the connection to the ISP 420 including using a public switched telephone/telecommunications network (PSTN) when using a modem. In addition, the computing system 410 uses any number of various ways 421 to perform the connection to the ISP 420 including using an integrated services digital network (ISDN), an asymmetric digital subscriber line (ADSL), an asynchronous transfer mode (ATM), or an Ethernet connection when using a network access card, as shown within the number of various ways 421.

The computing system 410 contains a modem/network access card 412 and a memory 414. As described above, when using the PSTN to connect to the ISP, a modem is employed. When using any of the other methods to connect to the ISP, a network access card is employed. The block 412 includes either a network access card or a modem, in whichever embodiment is used in the particular situation. The memory 414 supports a T38 protocol 422 to perform a fax over Internet protocol session. A software (S/W) 432 supports the T38 protocol 422 in some embodiments. A printer driver located in memory 434 supports the T38 protocol 422 in other embodiments. The memory 414 and the modem 412 are communicatively coupled within the computing system 410. In alternative embodiments, a T38 protocol 421 is operable within the modem 412 itself. The T38 protocol 421 is supported within the modem 412 using a number of different ways including firmware within the modem/network access card 431, an application specific integrated circuit (ASIC) located on a modem card/network access card 433, or a read only memory (ROM) 435 located on the modem/network access card 412.

The FIG. 4 shows an embodiment of the invention where the fax over Internet protocol driver is embedded in the computing system 410. A user of the computing system 410 is able to operate a fax over Internet protocol session and other Internet protocol sessions simultaneously.

Figure 5:
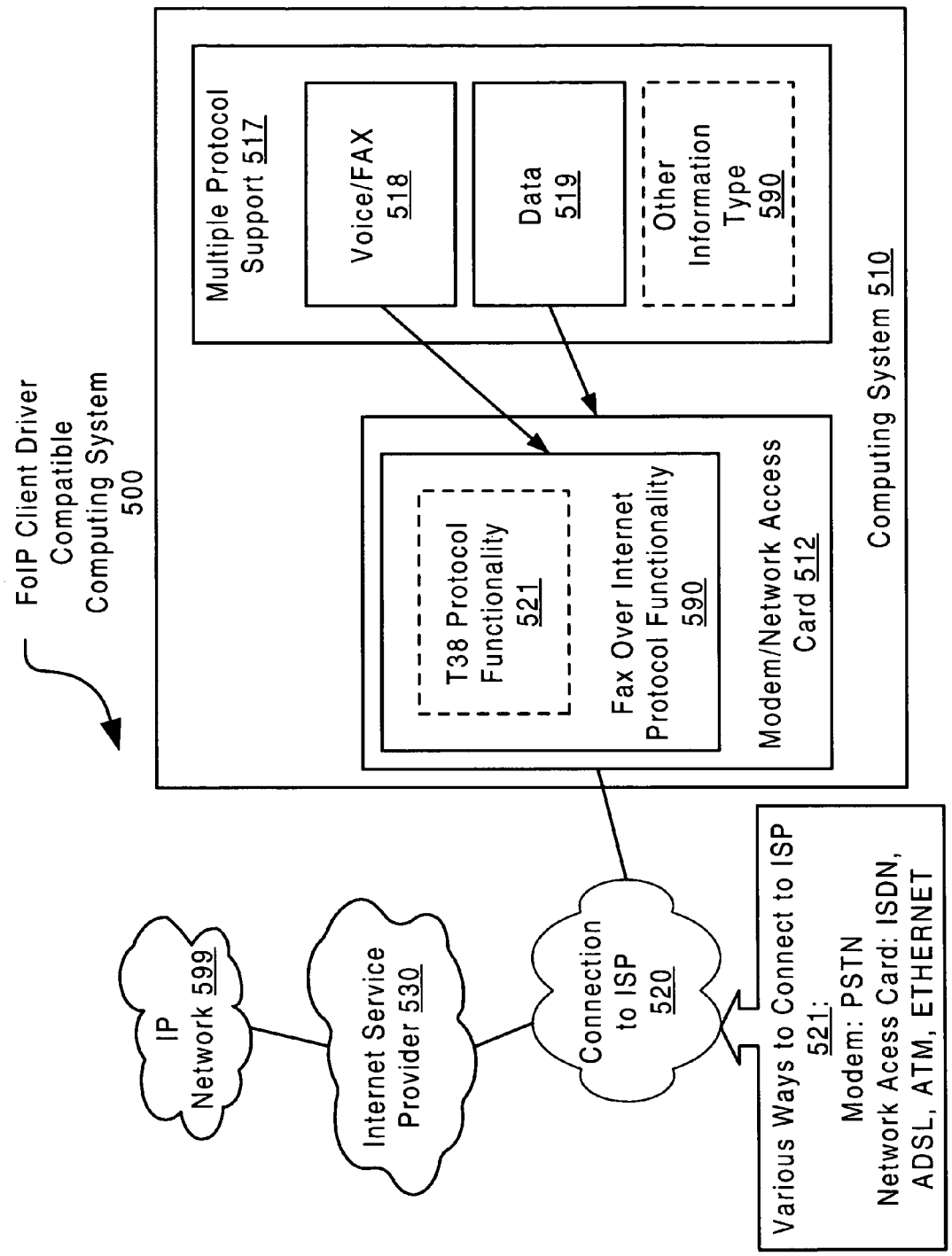
FIG. 5 is a system diagram illustrating an embodiment of a fax over Internet protocol client driver, built in accordance with the present invention, that is compatible with a computing system.

FIG. 5 is a system diagram illustrating an embodiment of a fax over Internet protocol client driver 500, built in accordance with the present invention, that is compatible with a computing system. The T38 client driver 500 that is compatible with a computing system contains a computing system 510 that connects to an ISP 530 as shown by a connection to ISP cloud 520. The ISP 530 is operable to connect to an Internet protocol network 599. The Internet protocol network 599 is itself the Internet in some embodiments, and it is a private dedicated network operating using an Internet protocol in others.

The computing system 510 uses any number of various ways 521 to perform the connection to the ISP 520 including using a public switched telephone/telecommunications network (PSTN) when using a modem. In addition, the computing system 510 uses any number of various ways 521 to perform the connection to the ISP 520 including using an integrated services digital network (ISDN), an asymmetric digital subscriber line (ADSL), an asynchronous transfer mode (ATM), or an Ethernet connection when using a network access card, as shown within the number of various ways 521.

The computing system 510 contains a modem/network access card 512. As described above, when using the PSTN to connect to the ISP, a modem is employed. When using any of the other methods to connect to the ISP, a network access card is employed. The block 512 includes either a network access card or a modem, in whichever embodiment is used in the particular situation. In addition, the computing system is operable to perform multiple protocol support 517. The modem 512 supports fax over Internet protocol functionality 590. In some embodiments, the fax over Internet protocol functionality 590 is supported by a T38 protocol functionality 521. The multiple protocol support 517 includes at least voice/fax information 518 and data information 519. In addition, any other information type 590 is able to be supported in accordance with the present invention. The multiple protocol support 517 provides a user of the computing system the opportunity to maintain multiple Internet protocol sessions. The FIG. 5 shows an embodiment of the invention where the fax over Internet protocol driver is embedded in the computing system 510.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A T38 client driver system comprising:
   a client having a T38 protocol client driver that is operable to support a fax over Internet protocol session;
   a first Internet service provider, the client connects to the first Internet service provider;
   a second Internet service provider that is operable to support a T38 protocol;
   an Internet protocol network, the first Internet service provider and the second Internet service provider are communicatively coupled via the Internet protocol network;
   a telephone network provider;
   a fax machine that is operable to be communicatively coupled to the second Internet service provider via the telephone network provider;
   a fax over Internet protocol session is maintained between the client and the fax machine via the first Internet service provider, the Internet protocol network, the second Internet service provider, and the telephone network provider; and
   the client maintains the fax over Internet protocol session with the fax machine using the T38 protocol client driver.

2. The T38 client driver system of claim 1, wherein the client comprises a memory; and
   the T38 protocol driver is contained in the memory.

3. The T38 client driver system of claim 1, wherein the Internet protocol network comprises a private network that is operable using an Internet protocol.

4. The T38 client driver system of claim 1, wherein the client connects to the first Internet service provider using an integrated services digital network.

5. The T38 client driver system of claim 1, wherein the client connects to the first Internet service provider using an asymmetric digital subscriber line.

6. The T38 client driver system of claim 1, wherein the client is operable to maintain at least one additional Internet protocol session.

7. The T38 client driver system of claim 1, wherein the client comprises a laptop computer.

8. The T38 client driver system of claim 1, wherein the client comprises a modem having a firmware; and
   the T38 protocol client driver is contained within the firmware.

9. A system for transmitting faxes, comprising:
   a personal computer client having a modem that is compatible with a fax over Internet protocol client driver that is supporting a fax over Internet protocol session;
   a first Internet service provider that is not a fax gateway, the personal computer client connects to the first Internet service provider using the modem and the fax over Internet protocol client driver;
   a second Internet service provider;
   a fax machine communicatively coupled to the second Internet service provider; and the personal computer client maintains a fax over Internet protocol session with the fax machine using the fax over Internet protocol client driver, and the personal computer client is not the first Internet service provider.

10. The system of claim 9, wherein the personal computer client maintains at least one additional Internet protocol session over the connection with the first Internet service provider without switching between modes.

11. The system of claim 9, wherein the Internet protocol network comprises the Internet.

12. The system of claim 9, wherein the Internet protocol network comprises a private network that is operable using an Internet protocol.

13. The system of claim 9 wherein the modem supports data communications over one or more of the group comprising a public switched telephone connection, a digital subscriber line connection, and an integrated services digital network connection.

14. The system of claim 9, wherein the fax over Internet protocol comprises a T38 protocol.

15. The system of claim 9, wherein the personal computer client connects to the first Internet service provider using a public switched telecommunications network.

16. A method to support a fax over Internet protocol session, the method comprising:
   connecting a client to a first Internet service provider that does not need to include fax over Internet protocol functionality over a first connection, the client comprises a fax over Internet protocol client driver that is operable to support a fax over Internet protocol session;
   establishing a second connection between the first Internet service provider and a second Internet service provider via an Internet protocol network;
   the second Internet service provider establishes a third connection with a fax machine; and
   transmitting a fax from the client to the fax machine using a fax over Internet protocol session that is supported by the fax over Internet protocol client driver of the client via the first connection, the second connection, and the third connection.

17. The method of claim 16, wherein the first connection comprises an asymmetric digital subscriber line.

18. The method of claim 16, wherein the client comprises at least one additional fax machine, the at least one additional fax machine comprises an Internet capable fax machine.

19. The method of claim 16, wherein the Internet protocol network comprises a private network that is operable using an Internet protocol.

20. The method of claim 16, further comprising supporting at least one additional Internet protocol session.

* * * * *